Jan. 1, 1935.  R. C. SESSIONS  1,986,369
METHOD OF AND APPARATUS FOR ELECTRIC HEATING AND WELDING
Filed Oct. 24, 1932  4 Sheets-Sheet 1

Jan. 1, 1935.     R. C. SESSIONS     1,986,369
METHOD OF AND APPARATUS FOR ELECTRIC HEATING AND WELDING
Filed Oct. 24, 1932     4 Sheets-Sheet 2

INVENTOR:
ROBERT C. SESSIONS
BY
ATTORNEYS

Patented Jan. 1, 1935

1,986,369

UNITED STATES PATENT OFFICE 1,986,369

METHOD OF AND APPARATUS FOR ELECTRIC HEATING AND WELDING

Robert C. Sessions, Lakewood, Ohio

Application October 24, 1932, Serial No. 639,330

40 Claims. (Cl. 219—6)

My invention relates to electric heating or welding by the induction method. It is particularly applicable to the progressive electric induction heating or welding of metallic articles, such as tubing, metal cylinders or shells, plates, et cetera.

In progressively heating or welding such articles by the electric induction method, difficulty has been experienced due to the reduced heating effect near the ends of the articles. I am aware that several ways of overcoming this difficulty have been previously suggested. My invention may be used independently of or in combination with one or more of these ways to assist in heating or welding near to an end, or the ends, of the articles.

Among the objects of my invention are:

Increasing the heat available for heating or welding as the starting end of the work is coming into and passing through the zone of influence of the magnetic field, and/or as the trailing end of the work is passing out of this zone, by decreasing or regulating the normal length of an air gap in the circuit of the magnetic field at the proper time whereby the heating or welding may be started nearer to the entering or starting end of the article to be heated or welded, and/or continued nearer to the trailing or finishing end of the article.

The provision of means for decreasing an air gap between a magnetic core on one side of the article to be heated or welded and a magnetic core on the other side of the article when the article is not present in said air gap between the cores.

The provision of means responsive to the position of the article to be heated or welded relative to the magnetic field for regulating, controlling or decreasing the magnetic reluctance of a normal path or circuit of the magnetic field.

The provision of means for decreasing an air gap between a magnetic core on one side of the article to be heated or welded and a magnetic core on the other side of the article during the time an end of the article is passing through the magnetic field but when the metal of the article is not present in said air gap.

The provision of means controlled by and responsive to the position of an article to be heated or welded relative to a magnetic field, whereby a magnetic core on one side of the article may be caused to move towards a magnetic core on the other side of the article so as to reduce or decrease the normal air gap space between opposite poles of said magnetic cores when the article is not present in this air gap space, whereby the magnitude of the induced current flowing in the article may be increased over that which would flow in the article if the normal length of the air gap space were not changed.

The provision of means responsive to the position of the moving work which is to be heated or welded relative to a magnetic field through which it passes, for moving a magnetic core on one side of the work towards and away from a magnetic core on the other side of the work.

The provision of induction heating or welding apparatus employing a magnetic core outside of a hollow article, such as a tube, to be heated or welded, with a plurality of poles in close proximity to the outside surface of the article, a magnetic core inside the article with poles close to the inside surface of the article opposite the outside poles, and means whereby the pole at one end of said magnetic cores may be caused or permitted to move towards and away from the opposite pole of the other of said magnetic cores, movement of said poles together being such as to decrease the normal air gap between the poles to increase the induced heating current flowing in the article when the metal of the article is not present in this air gap; that is, while the metal near an end of the article is passing through the magnetic field or zone in which the heating or welding currents are caused to flow and while the induced heating or welding current tends to flow in the metal near an end of the article.

The provision of induction heating or welding apparatus in which a tube, or hollow article, is traversed through a magnetic field, the normal path of the magnetic lines of force of the field being through magnetic cores inside and outside the article and such that these lines of force pass into and out of the tube at points spaced apart longitudinally in the direction of movement of the tube, and means for moving together the poles at the end of the magnetic cores, which the tube approaches, when the trailing end of the tube is passing out of the space or air gap between these poles so as to decrease the normal reluctance of the main path of the magnetic lines of force.

The provision of means for moving together poles at the end of the magnetic field from which the tube moves away before the entering end of the tube reaches these poles, and for moving these poles apart at the proper time to allow the entering end of the tube to pass through the air gap space between them.

In inductive heating apparatus for heating moving material, the provision of means for decreasing one or more air gaps in the magnetic circuit by moving together poles of magnetic cores on opposite sides of the material so as to increase the induced current beyond that which would otherwise normally flow in the material near one or both ends of the material.

These and other objects which will be apparent from the specification, drawings and claims, will be accomplished by the use of my invention.

In the progressive electric induction heating or welding of tube, pipe or other metallic articles, the work being welded is caused to be progressively traversed through a magnetic field so as to be progressively cut by (linked with) the magnetic field. It is customary to provide a magnetic circuit, or main path, for the magnetic field, generally consisting of laminated magnetic members or cores on opposite sides of the work. In the case of tubing, a magnetic core is positioned inside of the tube and a magnetic core, or a plurality of parallel magnetic cores, is located outside of the tube. This means that the magnetic circuit of the magnetic field must include one or more air gaps between the internal magnetic core and the external magnetic core, or cores, at the point or points where the magnetic field passes between the internal core and the external core, or cores. The magnetic field is developed in the cores by the use of a suitable electric induction coil, or coils, energized from a suitable source of alternating current, or its equivalent. In principle, the induction coil, or coils, may be likened to the primary coil of a transformer, and the work itself may be considered the secondary of the transformer. Thus we have a transformer with an open magnetic circuit because of the air gap, or air gaps, in this main path of the magnetic lines of force. The length of the air gap between the poles of the internal and external cores is preferably kept as small as possible in order to prevent excessively high magnetizing currents in the induction coil, or coils, and to reduce the leakage flux or leakage reactance.

When the work is passing through an air gap in the magnetic circuit, the metal of the work, if it is a magnetic substance, serves in itself to somewhat reduce the total length of the normal air gap or the distance between the poles of the external and internal magnetic cores. This is a condition that exists during the major portion of the time in which an article is being moved through the magnetic field and is being heated or welded. However, when one or the other (or both) of the ends of the work is entering or leaving the welding or heating zone (passing through the magnetic field) there are times when the metal of the work near an end is not located in the air gap, or in one of the air gaps, between the external and internal magnetic cores, and a shorter length of the work is surrounding the internal magnetic core. These and probably other conditions result in a decreased heating effect in the metal near the ends of the work (particularly the trailing end), and result in increased magnetizing current with a resulting poorer power factor. My invention overcomes, or helps to overcome, this difficulty by suitably regulating or reducing the magnetic reluctance of a path of the magnetic field at a predetermined time when it is desired to increase the heating effect above that which would exist at that time, if the reluctance were not thus reduced. In the forms shown and described, this is accomplished by decreasing the normal air gap (the total distance between a pole on one side of the work and a pole on the other side of the work when they are in their normal position for permitting the work to move between them), when the work is not present in this air gap. It will be obvious to those skilled in the art that the amount the normal air gap is reduced may be equivalent to the reduction afforded by the presence of the work in the air gap, or more or less than this reduction, depending upon the requirements of the particular work and the results which are desired to be effected. In general, it will be found that this reduction in the normal air gap should be such as to make the effective length of the air gap less than the effective length of the air gap when the work is present in the air gap.

Specifically, to accomplish this reduction of the air gap I have provided means for moving the poles at one or both ends of the magnetic cores together at the proper, predetermined times to cause the desired regulation of, or decrease in the reluctance of a main, or normal, path of the magnetic field.

Although the theory of operation of my invention and the explanation thereof I believe to be correct, it should be understood that the use of my invention to obtain increased heating effects in the ends of articles being inductively heated or welded is not in any way affected by the soundness of the theories nor the accuracy of the explanation given. Accordingly, the invention is not to be limited to the operation under the theories and explanation included herein.

The drawings are more or less diagrammatic and show many of the parts of my invention conventionally in order clearly to illustrate the principles and apparatus. The drawings show my invention applied to the progressive electric induction welding of a tube or pipe. It will be readily understood that my invention may be applied to either heating or welding a great variety of articles by the electric induction method.

Figure 1:
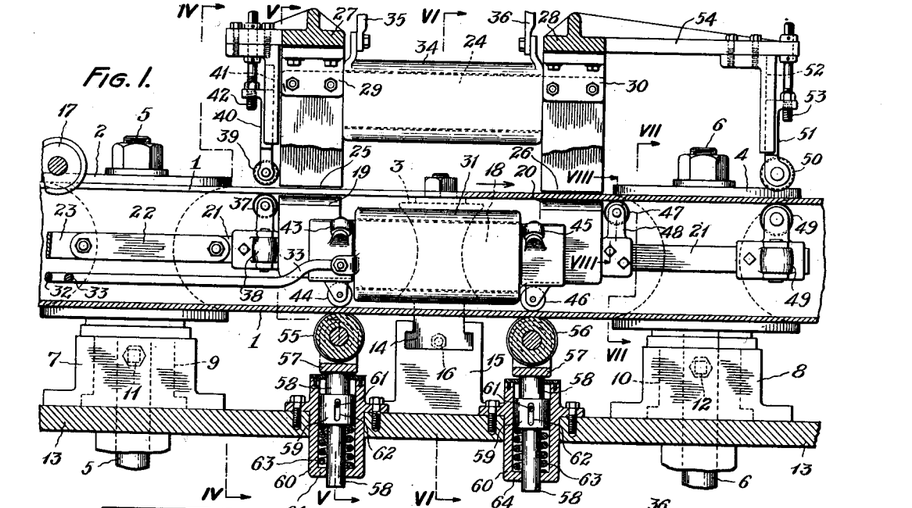
Fig. 1 is a longitudinal axial section of one form of my invention with certain parts shown in elevation. It shows a tube passing through the apparatus.
Figure 2:
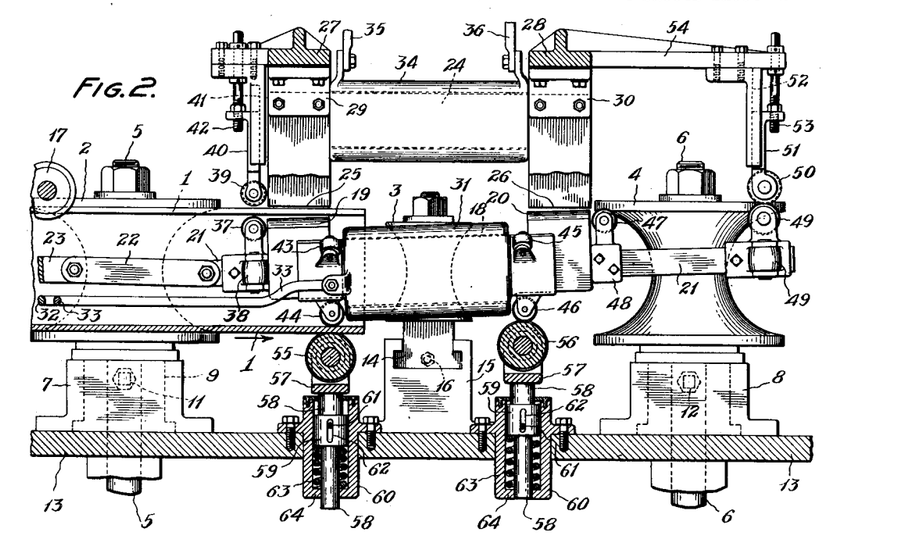
Fig. 2 is a view similar to Fig. 1 except that it shows the entering end of a tube just after it has started to pass into and through the magnetic field.
Figure 3:
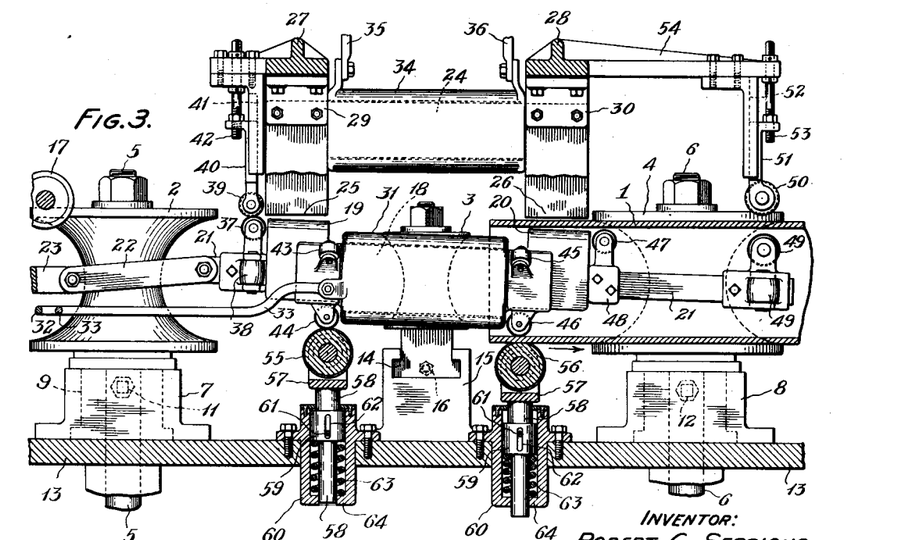
Fig. 3 is a view similar to Fig. 2 except that it shows the trailing end of a tube passing through the magnetic field.
Figures 4, 5, 6, 7, 8:
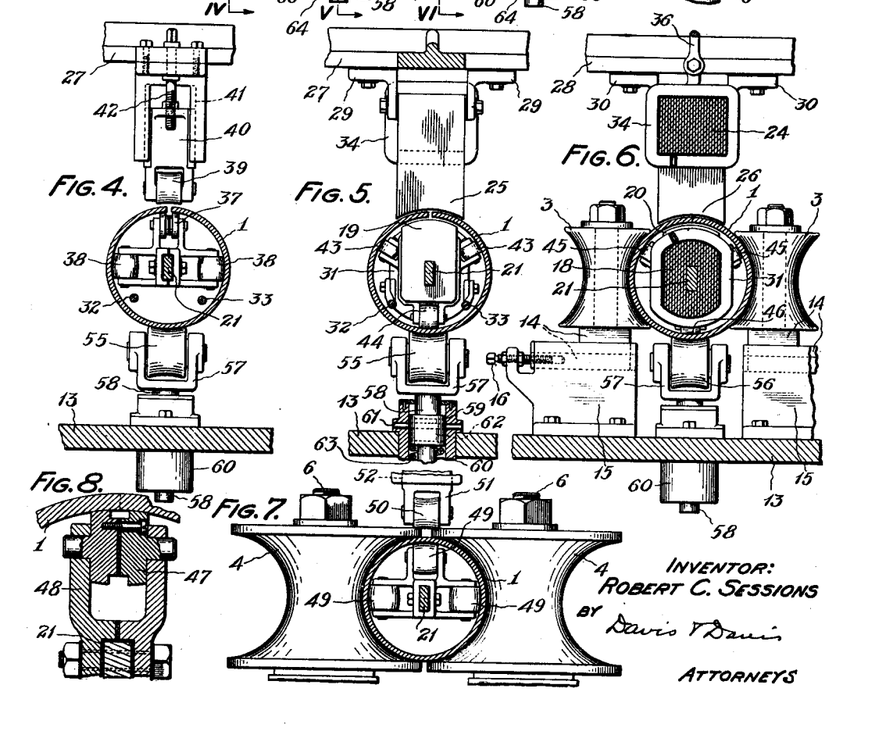
Fig. 4 is a vertical cross section taken in a plane indicated by the line IV—IV in Fig. 1.
Fig. 5 is a vertical cross section taken in a plane indicated by the line V—V in Fig. 1.
Fig. 6 is a vertical cross section taken in a plane indicated by the line VI—VI in Fig. 1.
Fig. 7 is a vertical cross section taken in a plane indicated by the line VII—VII in Fig. 1.
Fig. 8 is an enlarged vertical cross section taken in a plane indicated by the line VIII—VIII in Fig. 1.

In the form of apparatus shown in Figs. 1 to 8, inclusive, I have shown a tube or pipe 1 with a longitudinal open seam to be welded, the tube 1 being progressively traversed from left to right, as viewed in Figs. 1, 2 and 3. The tube is properly supported and moved by suitable sets of rolls 2, 3 and 4. The rolls 2 and 4 are shown adapted to be power driven at a desired speed by means of suitable driving mechanism (not shown) connected to the roll shafts 5 and 6. The two sets of work-feeding rolls 2 and 4 are supported on suitable brackets 7 and 8, respectively, which are equipped with cross slides 9 and 10, respectively. Screws 11 and 12 provide means for adjustment of the rolls 2 and 4 towards and away from the tube in known manner. The machine is provided with a suitable base 13. The rolls 3 are suitably supported by means of cross slides 14 on the brackets 15. These rolls 3 may be adjusted in known manner towards and away from the tube by means of the adjusting screws 16, and may be adjusted to bring the seam edges together at the desired point and in a desired manner, co-acting with rolls 2 and 4 in this function.

A seam-guiding, or seam-spreading, roll 17 is suitably positioned and constructed to cause the unwelded seam to pass through the machine in the proper position. This roll 17 may serve to spread apart the seam edges.

An internal magnetic core 18, having longitudinally spaced poles 19 and 20, is connected to a suitable member 21. The member 21 is connected through a link 22 to a longitudinal bar or structural member 23 which is suitably supported by a plate (not shown) which is adapted to extend through the unwelded seam of the tube, and be supported by external supporting means in a well known manner.

A magnetic core 24, with poles 25 and 26, is supported by the members 27 and 28 by means of suitable connecting members 29 and 30. The external magnetic core is preferably suitably insulated from its supporting members, as shown particularly in Fig. 5.

A coil 31 surrounds the internal magnetic core 18. Electric power is supplied to this coil 31 through suitable leads 32 and 33. I have also provided a coil 34 on the external magnetic core 24. The coil 34 is supplied with electric power through leads 35 and 36. The internal coil means 31 may be of any suitable or desired construction. It may be suitably insulated from the magnetic core 18 and from the work. The external coil means 34 may likewise be of any suitable construction. It also is insulated from the magnetic core 24. When energized, the coils serve to develop a magnetic field in the magnetic cores. The magnetic cores are so positioned to cause the magnetic field to link or cut the work to develop induced electromotive force in the work. The induced electromotive force causes induced heating or welding current to flow in the work.

The external magnetic core 24 is supported so that its poles 25 and 26 are opposite the poles 19 and 20, respectively, of the internal magnetic core 18.

Connected to the internal magnetic core 18 and its supporting member 21, I provide rollers 37 and 38 which are located in front of the pole 19. Opposite the roller 37 and outside of the line of travel of the pipe, a roller 39 is supported by a slide 40 which is adapted to be moved towards and away from the axis of the tube in a slideway 41 by means of an adjusting screw 42. The slideway 41 is supported by the member 27.

A pair of rollers 43 mounted on the core 18 are suitably positioned to engage the inside wall of the advancing tube at points on the same side of the axis of the tube as the poles 19 and 25, one roller being located on each side of the seam. A roller 44 is likewise mounted on the core 18 and positioned to engage the inside wall of the advancing tube on the opposite side of the axis of the tube from the rollers 43. The rollers 43 and 44 are preferably located in the same transverse plane and preferably engage the tube at points approximately in line with the rear edge of the poles 19 and 25.

A pair of rollers 45, similar to the rollers 43, are mounted on the core 18 and are suitably positioned to engage the inside wall of the advancing tube at points on the same side of the axis of the tube as the poles 20 and 26, one roller being located on each side of the seam. A roller 46 is likewise mounted on the core 18 and positioned to engage the inside wall of the advancing tube on the opposite side of the axis of the tube from the rollers 45. The rollers 45 and 46 are preferably located in approximately the same transverse plane and preferably engage the tube at points slightly in advance of the front edges of the poles 20 and 26.

A roller 47 is supported by the internal unit. It is adapted to engage the inside surface of the tube at a point immediately beyond the pole 20. The roller 47 is preferably constructed as shown in the enlarged detail cross section, Fig. 8, being made of two halves suitably bolted together and insulated from each other, and supported by a bracket 48. The bracket 48 is suitably insulated from the member 21. This construction is desirable when the roller 47 spans the seam, in order to prevent currents flowing through the roller instead of across the seam edges. When the seam is not located at the roller this insulated construction, of course, is not required. Further supporting and positioning rollers 49 are mounted on the member 21. A roller 50 is supported by a bracket 51 which is adapted to slide in a slideway member 52. The roller 50 may be adjusted vertically by means of an adjusting screw 53. The slideway member 52 is supported by an over-hanging arm 54 which is connected to the member 28.

I provide two rolls 55 and 56 outside of the tube and opposite the internal rollers 44 and 46, respectively. The supporting parts for these two rollers 55 and 56 are similar and will be given similar reference numerals. The rollers 55 and 56 are mounted in brackets 57. The brackets 57 are provided with extensions 58 which have portions 59 adapted to slide in the members 60, secured to the base 13 of the machine. The brackets 57 are restrained from turning by means of pins 61 which extend through slots 62 in the portions 59. Compression springs 63 are positioned between the enlarged portions 59 of the extensions 58 and ends 64 of the members 60, so that they tend at all times to yieldingly press the brackets 57 and the rollers 55 and 56 towards the axis of the tube.

In the operation of the arrangement shown in Figs. 1 to 8, inclusive, a tube to be welded is moved forward into the machine with its longitudinal, open seam suitably positioned by a seam-guiding or seam-spreading roller 17. At this time the poles 19 and 20 are held close to the poles 25 and 26, respectively, by springs 63 and rollers 55, 56, 44 and 46, so that the normal air gaps are reduced by a suitable, predetermined amount. As the entering end of the tube moves forward it engages the internal rollers 37 and 38. As the tube passes over these rollers, the front end of the internal core 18 and the front pole 19 are caused to assume the position shown in Fig. 2. In assuming this position, the front supporting roller 55 is pushed from its position shown in Fig. 3 by the internal roller 44. When the entering end of the tube has advanced to the plane of the rollers 44 and 55, the roller 55 is pushed away from the roller 44 by the metal of the tube to the position shown in Fig. 2. As the tube continues its forward movement, the entering end of the tube strikes the rollers 45 and causes the poles 20 and 26 to be moved apart from the position they occupy in Fig. 2 to the position shown in Fig. 1. The supporting roller 56 is at this time moved radially outward from the axis of the tube from the position shown in Fig. 2 to the position shown in Fig. 1. The tube continues passing through the magnetic field at its normal rate of travel. Fig. 1 represents this normal condition when the main body of the tube is passing through the magnetic field.

When the trailing end of the tube passes the rollers 37 and 38, no change occurs in the relative locations of the magnetic cores, due to the fact that the internal magnetic core is held in the position shown in Fig. 1 until the trailing end of the tube passes over the rollers 43 and 44. When this occurs the supporting roller 55 is moved radially inwardly by the spring 63 into contact with the roller 44, and continues to push the internal core 18 and the pole 19 towards the external pole 25 until the roller 37 contacts with the external roller 39, as shown in Fig. 3. The trailing end of the tube then continues through the magnetic field with the air gap between the front poles 19 and 25 suitably reduced. The length of the reduced air gap is controlled by and may be regulated by the adjustment of the screw 42 which determines the radial location of the roller 39. The position of the parts while the trailing end of the tube is passing through the magnetic field is shown in Fig. 3.

When the trailing end of the tube passes beyond the rollers 45 and 46, the external supporting roller 56 is moved by the spring 63 up into contact with the roller 46. However, the poles 20 and 26 are held apart by the rollers 47 and 49 which engage the inside wall of the tube. When the trailing end of the tube has passed over the roller 47 and the rollers 49, the action of the spring 63 on the roller 56 causes the pole 20 to be moved towards the pole 26 until the roller 49 contacts with the roller 50, as shown in Fig. 2. The radial location of the roller 50 may be regulated as desired by means of the adjusting screw 53 which is adapted to cause the slide 51 to move in the slideway bracket 52. The position of the roller 50 determines the length of the reduced air gap between the rear poles 20 and 26.

The cycle of operations is now ready to be repeated with another tube. It will be understood that the magnetic field is suitably energized at the proper time to cause the induced heating currents to flow in the metal of the tube, and that the feeding and pressure rollers are suitably adjusted. The longitudinal bar 23 serves to locate and hold the internal members in the proper longitudinal position with respect to the external members but does not restrain the internal members from movements toward and away from the external members due to the interposition of the link 22 between the bar 23 and member 21.

I prefer to call the total distance between the pole faces 19 and 25 or between the pole faces 20 and 26, when the parts are positioned as shown in Fig. 1, the normal air gap. I call the poles 19 and 25, front poles, and the poles 20 and 26, rear poles. The start of the cross-hatching in the top of the tube 1, as shown in Fig. 1, indicates the approximate location of the point where the unwelded edges of the seam first come into contact with each other.

In the form of my invention shown in Figs. 9 to 15, inclusive, instead of moving the internal magnetic core, I provide means for moving the external magnetic core, or cores. This form is particularly adapted for use when the external magnetic core is made up of a plurality of parallel sections disposed around the outside of the tube. I have shown a tube 1 being moved through the magnetic field from left to right in Fig. 9. The seam to be welded is shown as being located at the top of the tube. It will be understood that the seam may occupy any other desired position, such as at the bottom of the tube or at one side. The tube is fed into, through and out of the magnetic field by sets of work-feeding rolls 65 and 66 which are adapted to be power driven by any suitable mechanism (not shown). In the form shown in Fig. 9, I have provided two sets of rollers 67 and 68 which may be suitably supported and mounted for adjustment towards and away from the tube to control the pressure and space between the edges of the seam of that portion of the tube which is passing through the magnetic field. The rolls 65 and 66 also may be adjusted to co-operate with the rollers 67 and 68 to press together the edges of the seam of a portion of the tube within the magnetic field. It is possible to control the spacing and pressure between the seam edges by means of the rolls 65 and 66 alone to produce the required spacing and pressure between the seam edges within the magnetic field, but additional idle rolls such as the rolls 67 and 68 are of assistance in this regard. It will be understood that the rolls 65 and 66 may be adjusted toward and away from the tube. A suitable seam-guiding or seam-spreading roller similar to the roller 17 of Fig. 1 is preferably employed, but is not shown in Fig. 9.

An internal magnetic core 69, having longitudinally spaced poles 70 and 71, is supported by a suitable member 72 which may be termed an anchor bar. The anchor bar may be suitably supported by a plate (not shown) which is adapted to extend through the unwelded seam of the tube, the plate being connected to external supporting means in a well known manner.

The external magnetic core is here shown as consisting of two parallel parts 73 and 73', provided with front poles 74 and 74' which are positioned opposite the internal front pole 70, and with rear poles 75 and 75' which are positioned opposite the rear pole 71 of the internal magnetic core.

The internal magnetic core is provided with a suitable coil 76 which is adapted to be energized from a suitable source of electric current through connections similar to the connections 32 and 33 of Fig. 1. This coil means 76 may consist of a single series of turns or may consist of a plurality of series of turns connected in parallel or separately energized. I have also provided coils 77 and 77' on the external magnetic cores 73 and 73', respectively. These external coils are supplied with suitable electric current through connections 78 and 79, and 80 and 81. It will be understood that the form and location of the various coils may be varied as desired to suit required conditions and forms no part of my invention.

Figures 9, 10, 11:
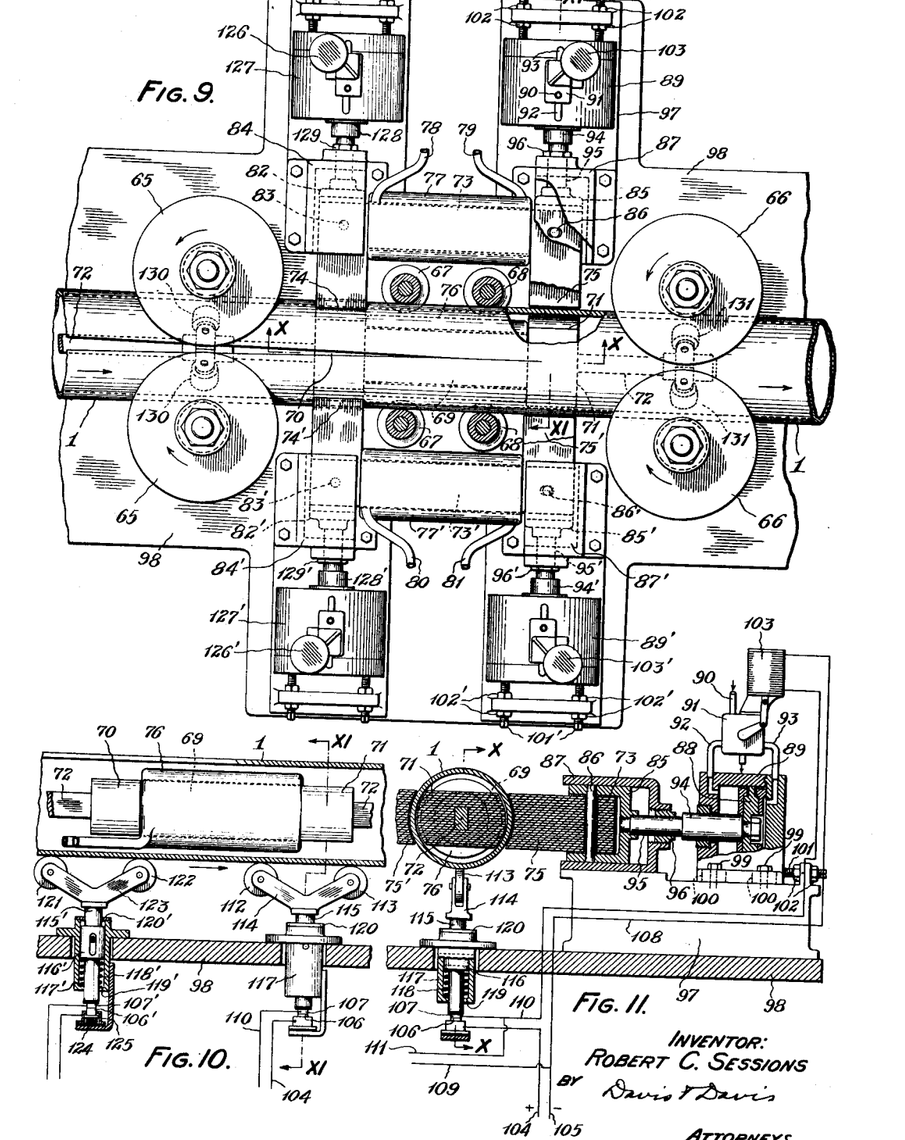
Fig. 9 is a plan view, partly in section, of a modified form of my invention.
Fig. 10 is a vertical, longitudinal section taken in a plane indicated by the line X—X in Fig. 9.
Fig. 11 is a fragmentary vertical cross section taken in a plane indicated by the line XI—XI in Fig. 9.

The external magnetic cores 73 and 73' are rigidly supported, but are adapted for movements towards and away from the internal magnetic core 69. The front ends of the external cores 73 and 73' are supported in brackets 82 and 82'. They are held in place by pins 83 and 83' and are suitably insulated from the brackets 82 and 82' and the pins 83 and 83' by suitable insulation such as shown in Fig. 11 for one of the rear poles. The magnetic cores 73 and 73' are adapted to turn about the pins 83 and 83' respectively. The brackets 82 and 82' are supported in housings 84 and 84', respectively, in such manner that the brackets 82 and 82' may slide in the housings 84 and 84'. A detailed discussion of the action of these parts will be given in connection with the explanation of Figs. 10 and 11.

The rear ends of the external cores 73 and 73' are mounted in brackets 85 and 85', corresponding to the brackets 82 and 82' for the front poles. Pins 86 and 86' pass through slotted holes in the brackets 85 and 85' and hold the rear ends of the cores 73 and 73', respectively, in the brackets 85 and 85'. The cores 73 and 73' are preferably insulated from the brackets 85 and 85' and the pins 86 and 86', as shown in Fig. 11. Suitable housings 87 and 87' are provided in which the brackets 85 and 85' are adapted to slide.

Fig. 11 shows the detailed construction of the parts which are provided for moving the pole 75 towards and away from the pole 71 of the internal magnetic core 69. Similar mechanism is provided at each end of each of the external magnetic cores. This may be seen generally in the plan view, Fig. 9. It will be understood that, if desired, this mechanism may be provided at only one end when it is desired to reduce the air gap at only one end. As shown in detail in Fig. 11, I preferably provide at each end of each of the external magnetic cores an air, or fluid, actuated piston 88 which is adapted to be moved back and forth in a cylinder 89. Air or other operating fluid is supplied through an inlet pipe 90 to a valve 91. Depending upon the position of the valve, the operating fluid passes into either the inside end of the cylinder 89 through a pipe 92, or into the outside end of the cylinder 89 through a pipe 93. A piston rod 94 is connected at one end to the piston 88 and passes out through the inside end of the cylinder 89 through a suitable gland and packing. The other end of the piston rod, marked 95, is connected to the sliding bracket 85, passing through an adjustable sleeve 96 in the housing 87. It will thus be seen that movement of the piston 88 in the cylinder 89 will cause movement of the pole 75 towards and away from the internal pole 71.

When fluid is admitted to one end of the cylinder 89 the valve 91 opens the other end of the cylinder to the exhaust indicated by the arrow at the bottom of valve 91 in Fig. 11, thus permitting piston 88 to move in the desired direction.

The housing 87 and the cylinder 89 are suitably supported on a bracket 97, which is mounted on a bedplate 98. I preferably attach the cylinder 89 to the bracket 97 by means of screws 99, which pass through the slotted holes 100 in the base of the cylinder 89. The cylinder 89 may be adjusted towards and away from the tube by means of screws 101 and nuts 102. Adjustment of the cylinder 89 towards and away from the tube determines the outermost position of the pole 75 due to the abutment of the piston 88 against the outer cylinder head. The innermost position of the pole 75 is established by adjustment of the sleeve 96 which limits the inward movement of the piston rod 94 when the shoulder between the ends 94 and 95 of the piston rod contacts with the outside end of the sleeve 96.

The valve 91 is actuated in one direction by a solenoid 103, and by a spring or other suitable known means (not shown) in the other direction. The circuit of the solenoid 103, and also the solenoid 103', is shown in Figs. 10 and 11. Power is supplied to wires 104 and 105 from a suitable source. One side of this circuit passes through switch members 106 and 107. The other side of the circuit is connected directly to the solenoids 103 and 103' through wires 108 and 109, respectively. Wire 110 leads from the switch to the solenoid 103 and wire 111 leads from the switch to the solenoid 103'. Thus the solenoids 103 and 103' are simultaneously energized by the closing of the switch members 106 and 107.

Corresponding parts for supporting and moving the pole 75' are marked with the same reference numerals, except for the addition of a prime mark, as the parts described in connection with the pole 75.

In the position shown in Fig. 11, the switch members 106 and 107 are closed and the solenoids 103 and 103' are energized. The opening and closing of the switch is controlled by the moving tube. Rollers 112 and 113 are mounted in a bracket 114 (Figs. 10 and 11). A rod 115 is connected to the bracket 114. This rod 115 has an enlarged portion 116, which is adapted to slide in a sleeve 117. A spring 118 acts between the end 119 of the sleeve 117 and the shoulder on the rod 115 which is formed by the enlarged portion 116. The spring 118 tends at all times to force the rod 115 towards the tube. The movement towards the tube is limited by a suitable plate 120. Means are provided to maintain the alignment of rollers 112 and 113 parallel with the axis of the tube as will appear in Figs. 10 and 11. A similar switch mechanism is provided for the control of the front ends of the external magnetic cores. This consists of switch members 106' and 107'. Rollers 121 and 122 are mounted in a bracket 123. The bracket 123 is connected to a rod 115' having an enlarged portion 116' which is adapted to slide in the sleeve 117'. The plate 120' serves to limit the movement of the rod 115' towards the tube. A spring 118' tends at all times to force the rod 115' towards the tube. The switch member 106' is supported by a spring 124 in the insulated bushing 125. Similar construction is used for the switch member 106. When the switch members 106' and 107' are closed power is supplied to the solenoids 126 and 126' which control the valves for cylinders 127 and 127' at the front ends of the external cores.

Rollers 122 and 113 are preferably located approximately in the same transverse plane with the rear edges of the poles 70 and 71, respectively. Rollers 121 and 112 are located somewhat in advance of the front edges of the poles 70 and 71, respectively.

Piston rods 128 and 128' are actuated by the cylinders 127 and 127', respectively. These piston rods 128 and 128' pass through adjustable sleeves 129 and 129' in the housings 84 and 84', and are connected to the sliding brackets 82 and 82'.

The slotted holes in the brackets 85 and 85' for the pins 86 and 86' are necessary to permit movement of one end of the external magnetic cores independently of the other end, for example, movement of the sliding brackets 85 and 85' on a straight line towards or away from the tube while the brackets 82 and 82' are held stationary.

Sets of internal rollers 130 and 131 are connected to the member 72 and are adapted to engage the inside surface of the tube to assist in supporting and positioning the internal members.

Figure 12:
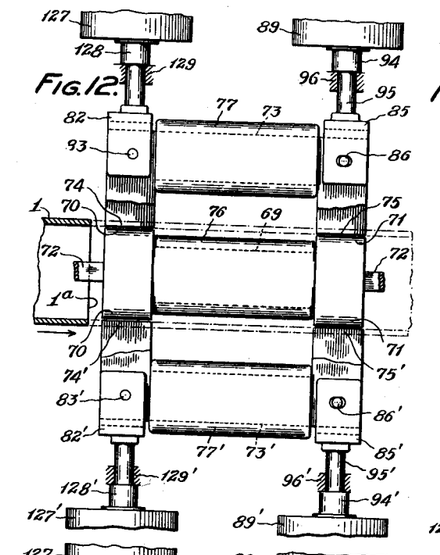
Fig. 12 is a diagrammatic, plan view of a portion of the apparatus of Fig. 9, showing the position of the magnetic cores when no tubing is passing through the magnetic field.
Figure 13:
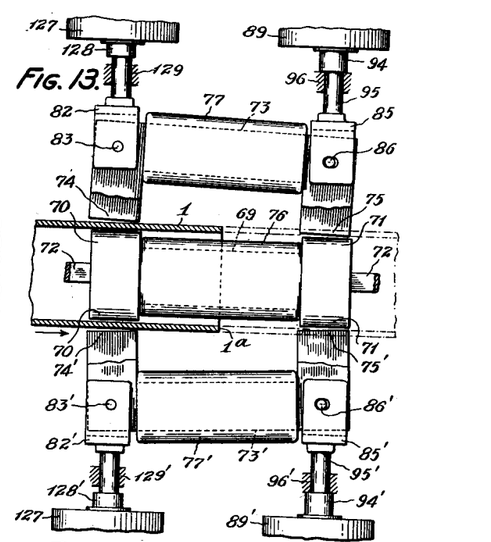
Fig. 13 is a plan view similar to Fig. 12, except that it shows the position of the magnetic cores when the entering end of the tube has passed the front poles and has not yet reached the rear poles.
Figure 14:
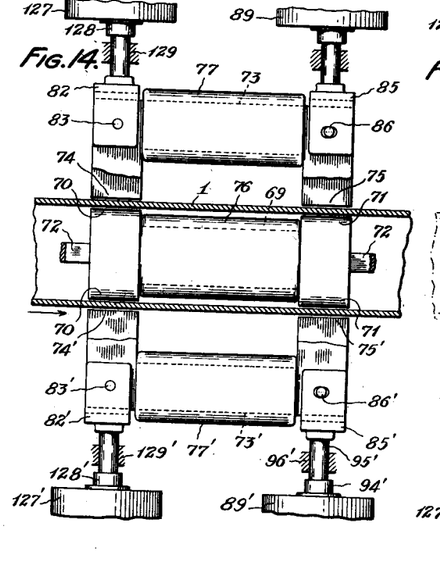
Fig. 14 is a plan view similar to Fig. 12, except that it shows the position of the magnetic cores when the main body of a tube is passing through the magnetic field.
Figure 15:
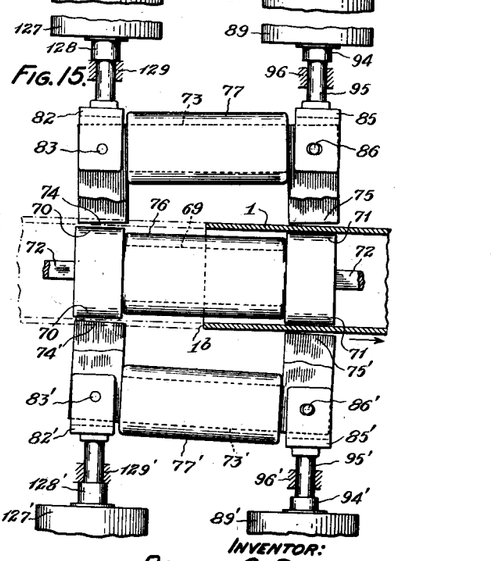
Fig. 15 is a plan view similar to Fig. 12, except that it shows the position of the magnetic cores when the trailing end of a tube has passed through the air gap between the front poles and is continuing on through the magnetic field.

In the operation of the arrangement shown in Figs. 9 to 15, inclusive, reference to Figs. 12, 13, 14 and 15 will show the sequence of the steps as regards the position of the external magnetic members and the control of the length of the air gaps. Fig. 12 shows entering end 1a of a tube as it is approaching the front poles 70 and 74—74'. Both ends of the external cores are at their innermost positions. Fig. 13 shows the front poles 70 and 74—74' moved apart and the rear poles 71 and 75—75' still held together. The entering end of the tube is passing over the internal magnetic core and has not yet reached the rear poles. Just before the entering end of the tub reaches the rear poles they are moved apart to the positions shown in Fig. 14. In this position the poles at both ends of the external cores are in their outermost positions and the air gaps all have their normal length. This is the condition that exists while the main body of the tube is passing through the magnetic field and corresponds with the position of the parts as shown in Figs. 9 to 11. As soon as the trailing end 1b of the tube passes the front poles 70 and 74—74', the poles 74—74' are moved towards the axis of the tube to the position shown in Fig. 15, thus reducing the length of the normal air gap between these front poles. In Fig. 15 the trailing end of the tube has not yet passed beyond the rear poles 71 and 75—75'. When the trailing end of the tube passes these poles 71 and 75—75', the poles 75—75' are caused to move towards the axis of the tube, the parts again assume the position shown in Fig. 12, and the cycle of operations is ready to be repeated with the next on-coming tube.

The operation of the mechanism which controls the movement of the external magnetic cores is best understood by reference to Figs. 10 and 11. Figs. 10 and 11 both show the positions of the parts when a tube is passing between the poles. When no tube is present and the parts are positioned as shown in Fig. 12, the rollers 121—122 and the rollers 112—113 are held inwardly towards the axis of the tube by the springs 118' and 118 respectively, and the switch members 106' and 107' and the switch members 106 and 107 are separated so that the solenoids 126—126' and the solenoids 103—103' are not energized. At this time the piston 88 and the corresponding pistons at the other positions are held inwardly towards the tube so as to maintain the desired reduced air gaps.

When the entering end of the tube strikes the roller 121, it causes the switch members 106'—107' to contact with each other and to close the circuit to the solenoids 126—126'. This causes the poles 74—74' to be moved outwardly to the positions shown in Fig. 13, and permits the entering end of the tube to pass through the air gap between the front poles 74—74' and the front pole 70. When the entering end of the tube strikes the roller 112, it moves the parts to the positions shown in Fig. 10 and causes the switch members 106—107 to contact with each other and close the circuit to the solenoids 103—103'. This causes the rear poles 75—75' to be moved outwardly from the rear pole 71 to the position shown in Fig. 14 and the entering end of the tube may pass freely between the rear poles. When the trailing end of the tube passes over roller 121, the switch members 106'—107' are still held closed, but when the trailing end of the tube passes over roller 122 the spring 118' causes the switch members 106'—107' to open, and the circuit to the solenoids 126—126' is broken. This causes the piston rods 128—128' to move the poles 74—74' radially inward to the position shown in Fig. 15. Thus the trailing end of the tube continues through the magnetic field with the air gap between the poles 74—74' and the pole 70 reduced a predetermined amount. When the trailing end of the tube passes over the roller 113 the spring 118 causes the switch members 106—107 to open. This breaks the circuit of the solenoids 103—103' and causes the poles 75—75' to be moved radially inward to the positions shown in Fig. 12. The cycle is then ready to be repeated with the next on-coming tube.

While I have illustrated and described two possible forms of apparatus for carrying out my invention, it will be apparent to those skilled in the art that other forms may be used, and various modifications may be made without departing from the spirit and scope of my invention.

I do not wish to be limited to the specific details of my method and apparatus shown and described herein, but claim as my invention all embodiments thereof coming within the scope of the appended claims.

I claim:

1. The method of electrically welding tubing which consists of causing an unwelded-seam tube to pass through an alternating magnetic field, the tube moving longitudinally of itself so that it is progressively linked with the lines of force of said magnetic field to cause electric current to be induced to flow in the metal of said tube and across said seam, applying welding pressure to said tube, and regulating the magnetic reluctance of a normal path of said lines of force while an end portion of said tube is passing through said magnetic field.

2. The method of heating a longitudinal open seam in a tube which consists in inducing alternating electromotive force in successive sections of the tube by moving said tube through a magnetic field, closing the open seam, and regulating the magnetic reluctance of a path of said magnetic field while an end portion of said tube is passing through said magnetic field.

3. In electric induction heating of moving work in which the work is moved through air gaps between spaced pairs of magnetic poles comprising a common magnetic circuit, the method of increasing the heating effect in an end portion of the work which consists in moving a pole on one side of the work towards a pole on the opposite side of the work to decrease the space between said poles a predetermined amount when said end portion reaches a predetermined position relative to said poles.

4. In apparatus for electric induction heating, induction coil means adapted to develop a magnetic field for inductively heating a moving article, and means controlled by the moving article for regulating the magnetic reluctance of a path of the magnetic field to automatically attain a reluctance whereby in correlation with the other conditions then existing the desired heating effect may be obtained.

5. In apparatus for electric induction heating, induction coil means adapted to develop a magnetic field for inductively heating a moving article, and means responsive to the movement of a predetermined portion of said article past a predetermined point for regulating the magnetic reluctance of a path of said magnetic field.

6. In apparatus for electric induction heating, magnetic cores having poles opposite each other on opposite sides of the article to be heated, induction coil means adapted to develop a magnetic field for inductively heating said article, means for causing relative traversing movement of said article and said field, and means controlled by the article for changing the space between said poles a predetermined amount when said article and said poles reach a predetermined relative position with respect to one another.

7. In apparatus for the progressive electric induction heating or welding of tubular articles, a core within the path of the tubular article, a core outside the path of said tubular article, said cores extending generally longitudinally of said tubular article and having their front and rear ends spaced from each other by air gaps, means for developing a magnetic field in said cores, means for traversing said tubular article towards, through and out of said magnetic field whereby alternating electromotive force is progressively induced in said tubular article, and means for regulating the magnetic reluctance of a path of said magnetic field when the trailing end of said tubular article is passing through said magnetic field.

8. In apparatus for the progressive electric induction heating or welding of tubular articles, a core within the path of the tubular article, a core outside the path of said tubular article, said cores extending generally longitudinally of said tubular article and having their front and rear ends spaced from each other by air gaps, means for developing a magnetic field in said cores, means for traversing said tubular article towards, through and out of said magnetic field whereby alternating electromotive force is progressively induced in said tubular article, and means for regulating the magnetic reluctance of a path of said magnetic field when the entering end of said tubular article is passing through said magnetic field.

9. In apparatus for the progressive electric induction heating or welding of tubular articles, a core within the path of the tubular article, a core outside the path of said tubular article, said cores extending generally longitudinally of said tubular article and having their front and rear ends spaced from each other by air gaps, means for developing a magnetic field in said cores, means for traversing said tubular article towards, through and out of said magnetic field whereby alternating electromotive force is progressively induced in said tubular article, and means for regulating an air gap between the front ends of said cores when the trailing end of said tubular article has passed out of said air gap.

10. In apparatus for the progressive electric induction heating or welding of tubular articles, a core within the path of the tubular article, a core outside the path of said tubular article, said cores extending generally longitudinally of said tubular article and having their front and rear ends spaced from each other by air gaps, means for developing a magnetic field in said cores, means for traversing said tubular article towards, through and out of said magnetic field whereby alternating electromotive force is progressively induced in said tubular article, and means for regulating the air gap between the rear ends of said cores when the entering end of said tubular article is approaching said air gap.

11. In apparatus for the progressive electric induction heating or welding of tubular articles, a core within the path of the tubular article, a core outside the path of said tubular article, said cores extending generally longitudinally of said tubular article and having their front and rear ends spaced from each other by air gaps, means for developing a magnetic field in said cores, means for traversing said tubular article towards, through and out of said air gaps whereby alternating electromotive force is progressively induced in said tubular article, means for regulating an air gap between the front ends of said cores when the trailing end of said tubular article has passed out of said air gap, and means responsive to the movement of said tubular article for actuating said last named means.

12. In apparatus for the progressive electric induction heating or welding of tubular articles, a core within the path of the tubular article, a core outside the path of said tubular article, said cores extending generally longitudinally of said tubular article and having their front and rear ends spaced from each other by air gaps, means for developing a magnetic field in said cores, means for traversing said tubular article towards, through and out of said air gaps whereby alternating electromotive force is progressively induced in said tubular article, and means for moving the front end of one of said cores towards the front end of the other of said cores at a predetermined time during the movement of said tubular article through the apparatus.

13. In apparatus for the progressive electric induction heating or welding of tubular articles, a core within the path of the tubular article, a core outside the path of said tubular article, said cores extending generally longitudinally of said tubular article and having their front and rear ends spaced from each other by air gaps, means for developing a magnetic field in said cores, means for traversing said tubular article towards, through and out of said air gaps whereby alternating electromotive force is progressively induced in said tubular article, and means for moving the rear end of one of said cores towards the rear end of the other of said cores at a predetermined time during the movement of said tubular article through the apparatus.

14. In apparatus for electric induction heating or welding of metal articles, a magnetic member having a pole on one side of the work to be heated or welded, means for supporting said magnetic member, another magnetic member having a pole on the other side of said work, said latter pole being spaced from and opposite said first named pole, induction coil means for setting up magnetic lines of force in said magnetic members to induce electric current to flow in said work, means for causing relative traversing movement of said work and said magnetic members, and means responsive to the attainment of said work and said poles to a predetermined relative position with respect to one another for decreasing the normal length of the path of said magnetic lines through the space between said poles.

15. In apparatus for the progressive electric induction heating of metal articles, a magnetic core on one side of the article to be heated, said core having front and rear poles spaced apart longitudinally in the direction of movement of said article, another magnetic core on the opposite side of said article, said other core having front and rear poles opposite and spaced from said front and rear poles of said first-named core, means for traversing said article longitudinally past said cores and through the space between said poles, and means for moving the front pole of one of said magnetic cores towards the front pole of the other of said magnetic cores a predetermined amount when a predetermined point on said article reaches a predetermined position with respect to said cores.

16. In apparatus for the progressive electric induction heating of metal articles, a magnetic core on one side of the article to be heated, said core having front and rear poles spaced apart longitudinally in the direction of movement of said article, another magnetic core on the opposite side of said article, said other core having front and rear poles opposite and spaced from said front and rear poles of said first-named core, means for traversing said article longitudinally past said cores and through the space between said poles, and means for moving the rear pole of one of said cores towards the rear pole of the other of said cores a predetermined amount when a predetermined point on said article reaches a predetermined position with respect to said cores.

17. In apparatus for the progressive electric induction heating or welding of tubular articles, a core within the path of the tubular article, a core outside the path of said tubular article, said cores extending generally longitudinally of said tubular article and having their front and rear ends spaced from each other by air gaps, means for developing a magnetic field in said cores, means for traversing said tubular article towards, through and out of said air gaps whereby alternating electromotive force is progressively induced in said tubular article, and means adapted to permit the front end of one of said cores to move towards the front end of the other of said c res when a predetermined point n said article reaches a predetermined position with respect to said cores.

18. In apparatus for electric induction heating, means for developing a magnetic field for inductively heating a moving article, means controlled by the moving article adapted to regulate the magnetic reluctance of a path of the magnetic field, and means for adjustably varying the value to which said reluctance is regulated.

19. In apparatus for electric induction heating or welding of metal articles, a magnetic member having a pole on one side of the work to be heated or welded, means for supporting said magnetic member, another magnetic member having a pole on the other side of said work, said latter pole being spaced from and opposite said first named pole, induction coil means for setting up magnetic lines of force in said magnetic members to induce electric current to flow in said work, means for causing relative traversing movement of said work and said magnetic members, means responsive to the attainment of said work and said poles to a predetermined relative position with respect to one another for decreasing the normal length of the path of said magnetic lines through air between said poles, and means for adjusting the amount of decrease of said normal length of the path of said magnetic lines.

20. In apparatus for electric induction heating, induction coil means adapted to develop a magnetic field for inductively heating a moving article, means adapted to increase the temperature developed in an end portion of the article, and means responsive to the movement of the article past a predetermined point for actuating said last named means.

21. In progressive heating or welding by the electric induction method in which magnetic cores are supported on opposite sides of the work with an air gap between them and in which the work is progressively moved through the air gap to be linked with a magnetic field, the method of controlling the heating effect in the work near an end of the work which consists in regulating the air gap between the magnetic cores on opposite sides of the work when the work is passing through the magnetic field and is not present in said air gap between said cores.

22. In electric induction heating of moving work in which the work is moved through an air gap between energized magnetic poles on opposite sides of the work, the method of controlling the heating effect in an end portion of the work which consists in regulating the magnetic reluctance of the air gap when the work moves out of said air gap.

23. In apparatus for electric induction heating, induction coil means adapted to develop a magnetic field for inductively heating a moving article, means adapted to increase the temperature developed in an end portion of the article, and means responsive to the movement of a selected portion of said article past a predetermined point for controlling the actuation of said last named means.

24. In apparatus for electric induction heating, induction coil means adapted to develop a magnetic field for inductively heating a moving article, means adapted to increase the heating effect in an end portion of the article above that which would otherwise exist in said end portion, and means governed by the passage of an end of said article for controlling the actuation of said last named means.

25. In apparatus for the progressive electric induction welding of a longitudinal seam in tubing, induction coil means adapted to develop a magnetic field for inductively heating a moving tube, means adapted to increase the heating effect developed in the seam near an end of said tube above that which would otherwise exist, said last named means comprising means for regulating the magnetic reluctance of the path of said magnetic field, and means responsive to the movement of said tube past a predetermined point for actuating said last named means.

26. In apparatus for the progressive electric induction welding of a longitudinal seam in tubing, induction coil means adapted to develop a magnetic field for inductively heating a moving tube, means adapted to increase the heating effect developed in the seam near an end of said tube above that which would otherwise exist, said last named means comprising means for regulating the magnetic reluctance of the path of said magnetic field, means responsive to the movement of said tube past a predetermined point for actuating said last named means, and means for limiting the extent of action of said regulating means.

27. In apparatus for electric induction heating or welding of metal articles, a magnetic member having a pole on one side of the work to be heated or welded, means for supporting said magnetic member, another magnetic member having a pole on the other side of said work, said latter pole being spaced from and opposite said first named pole, induction coil means for setting up magnetic lines of force in said magnetic members to induce electric current to flow in said work, means for causing relative traversing movement of said work and said magnetic members, and means for changing the length of the space between said poles when an end of said article reaches a predetermined position with respect to said poles.

28. In apparatus for the progressive electric induction heating or welding of tubular articles, a core within the path of the tubular article, a core outside the path of said tubular article, said cores extending generally longitudinally of said tubular article and having their front and rear ends spaced from each other by air gaps, means for developing a magnetic field in said cores, means for traversing said tubular article towards, through and out of said air gaps whereby alternating electromotive force is progressively induced in said tubular article, and means responsive to the movement of an end of said tubular article past a predetermined point for regulating the length of at least one of said air gaps.

29. In apparatus for electric induction heating, induction coil means adapted to develop a magnetic field for inductively heating a moving article, and means for regulating the magnetic reluctance of a path of the magnetic field, said last named means being responsive to the movement of an end of said article past a predetermined point.

30. In apparatus for the progressive electric induction welding of a longitudinal seam in tubing, in which the tube is caused to be progressively linked with a magnetic field whereby electric current is induced to flow in said tube and across said seam, magnetic cores for said magnetic field inside and outside of said tube, said cores being relatively stationary with respect to the progressive welding of the seam, said cores being opposite each other and separated by an air gap, means for causing one of said cores to move towards the other of said cores whereby the length of said air gap is shorter when an end portion of said tube is being heated, and means for controlling the amount said air gap is decreased whereby the decrease in said air gap may be properly correlated with the other factors involved in the attainment of the desired heating effect in said end portion.

31. In apparatus for the progressive electric induction welding of a longitudinal seam in tubing in which the tube is caused to progressively pass through an air gap between magnetic cores inside and outside of the tube, means for automatically causing the magnetic reluctance of said air gap to be less than it otherwise normally would become when an end of said tube is passing through said magnetic field, and means for controlling the amount said reluctance is reduced.

32. In apparatus for the progressive electric induction welding of a longitudinal seam in tubular articles, an internal, laminated magnetic core, an external, laminated magnetic core, means for developing an alternating magnetic field of force in said cores, means for causing relative traversing movement of said cores and said tubular article whereby said tubular article is progressively linked with said magnetic field, said cores serving as a magnetic circuit for said magnetic field, said magnetic circuit also including a plurality of longitudinally-spaced air gaps between said cores, and means for automatically regulating the magnetic reluctance of at least one of said air gaps when an end portion of the tubular article is in the zone of influence of said magnetic field.

33. In apparatus for the progressive electric induction heating or welding of tubular articles, a core within the path of said tubular article, a core outside the path of said tubular article, said cores extending generally longitudinally of said tubular article and having their front and rear ends spaced from each other by air gaps, means for developing a magnetic field in said cores, means for traversing said tubular article towards, through and out of said magnetic field whereby alternating electromotive force is progressively induced in said tubular article, and means for regulating the magnetic reluctance of the air gap between the front ends of said cores when the trailing end of said tubular article passes out of said air gap.

34. In progressive electric induction heating or welding of tubular articles, the method which includes the steps of causing relative traversing movement of the tube and air gaps between longitudinally spaced pairs of magnetic poles comprising a common magnetic circuit, with the tube passing through the air gaps in a direction parallel to its axis, and increasing the effective heating in an end portion of said tube above that which otherwise would occur by controlling the magnetic leakage of said magnetic circuit by so regulating its magnetic reluctance that, in correlation with the factors then involved in effecting the heating, proper heating of said end portion is effected.

35. In progressive electric induction heating or welding of tubular articles, the method which includes the steps of causing relative traversing movement of the tube and air gaps between longitudinally spaced pairs of magnetic poles comprising a common magnetic circuit, with the tube passing through the air gaps in a direction parallel to its axis, and increasing the effective heating in an end portion of said tube above that which otherwise would occur by regulating the magnetic reluctance of said magnetic circuit a predetermined amount when said end portion reaches a predetermined position.

36. In progressive electric induction heating or welding of tubular articles, the method which includes the steps of causing relative traversing movement of the tube and air gaps between longitudinally spaced pairs of magnetic poles comprising a common magnetic circuit, with the tube passing through the air gaps in a direction parallel to its axis, and regulating the magnetic reluctance of said magnetic circuit a predetermined amount when an end portion reaches a predetermined position, whereby the effective heating in an end portion of said tube may be increased above that which otherwise would occur.

37. In the progressive heating or welding of a tube by the electric induction method in which a magnetic field is developed in magnetic cores which are supported inside and outside of the tube with an air gap between the cores through which air gap the tube moves, the method of increasing the heating effect in the metal of the tube near an end of the tube which consists in inserting magnetic material, other than the tube to be welded itself, into an air gap between opposite poles of the cores on opposite sides of the tube when the metal of the tube near an end is being linked with the magnetic field but is not present in the air gap between the poles, whereby there is established a shorter air path for said magnetic field than otherwise would then exist.

38. In progressive heating or welding by the electric induction method in which magnetic cores are supported on opposite sides of the work with an open space between them and in which the work is progressively moved through the open space to be linked with a magnetic field, the method of increasing the heating effect in the work near an end of the work which consists in decreasing the open space between poles of the magnetic field on opposite sides of the work when the work is passing through the magnetic field and is not present in said space between said poles by moving magnetic material, other than the material of the work, into said space.

39. The method of electrically welding tubing which consists in moving an open seam tube through a magnetic field, the tube moving longitudinally of itself so that it is progressively linked with the lines of force of said magnetic field whereby alternating current is induced to flow in the metal of said tube, and inserting magnetic material into a portion of a normal path of said lines of force where said lines of force would otherwise then pass through air, when an end of said tube reaches a predetermined position relative to said magnetic field, whereby the magnetic reluctance of said normal path is less than it otherwise would be at that time.

40. The method of heating a longitudinal seam in a tube which consists in inducing alternating electromotive force in successive sections of the tube by moving said tube through a magnetic field, and inserting magnetic material into said field at a point where said field otherwise would then pass through air, when a predetermined section of said tube is passing through said magnetic field.

ROBERT C. SESSIONS.